UNITED STATES PATENT OFFICE.

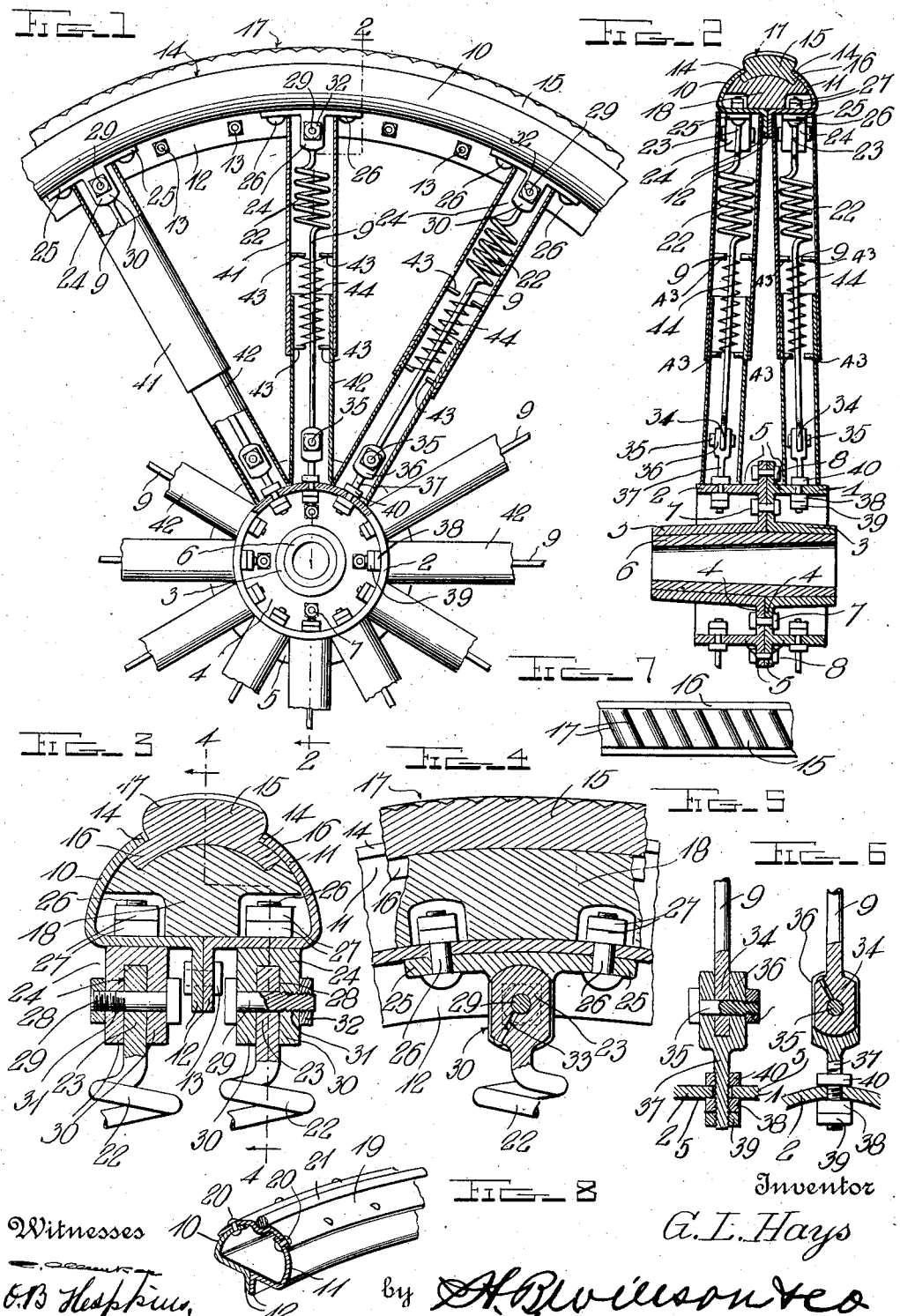

GEORGE LINCOLN HAYS, OF BELLEVUE, PENNSYLVANIA.

SPRING-WHEEL AND TIRE.

997,388.  Specification of Letters Patent.  Patented July 11, 1911.

Application filed October 8, 1910. Serial No. 586,043.

*To all whom it may concern:*

Be it known that I, GEORGE LINCOLN HAYS, a citizen of the United States, residing at Bellevue, in the county of Allegheny and State of Pennsylvania, have invented certain new and useful Improvements in Spring-Wheels and Tires; and I do declare the following to be a full, clear, and exact description of the invention, such as will enable others skilled in the art to which it appertains to make and use the same.

My invention relates to improvements in spring wheels and tires.

The principal object of the invention is to provide a wheel for automobiles, carriages, wagons, and other vehicles which will have all of the advantages of a pneumatic tired wheel in point of resiliency, and yet be free from the usual objections to such rubber tired wheels and at the same time be much stronger, more durable, and less expensive to construct and maintain.

Another object of the invention is to provide a spring or resilient wheel of this character having improved hub and tire members united by resilient spokes so connected and arranged that the wheel will withstand all strains and loads placed upon it, will be prevented from dishing and at the same time will have sufficient elasticity or cushion to prevent shocks and jars incident to travel over rough roads from being transferred from the wheel to the body of the vehicle.

With the above and other objects in view, the invention consists of certain novel features of construction, combination and arrangement of parts as will be fully described and particularly pointed out in the appended claims.

In the accompanying drawings:—Figure 1 is a detail side view of a portion of a resilient wheel constructed in accordance with my invention, parts being broken away and in section to more clearly illustrate the construction; Fig. 2 is a detail section taken on the plane indicated by the line 2—2 in Fig. 1; Fig. 3 is an enlarged transverse sectional view through the tire or rim portion of the wheel; Fig. 4 is a detail section taken on the plane indicated by the line 4—4 in Fig. 3; Fig. 5 is a detail sectional view showing the connection for the inner end of one of the spokes; Fig. 6 is a view of the parts shown in Fig. 5 looking in the plane at right angles, parts being broken away in section; Fig. 7 is a detail plan view of a portion of the tread member of the wheel; and Fig. 8 is a sectional perspective view showing a modified form of tread member.

My improved wheel comprises a hub member composed of inner and outer sections 1 and 2 constructed from stamped or pressed steel. Each of these hub sections consists of an inner frusto-conical-shaped portion 3 having a radially projecting annular flange 4 at its inner end, which flange 4 carries on its outer face a circular flange 5. The frusto-conical-shaped portions 3 of the two hub sections are adapted to receive a double frusto-conical shaped bushing 6 which is retained in position in the hub and effectively prevented from shifting longitudinally by reason of the shape and arrangement of the parts 3, (see Fig. 2). The radial flanges 4 of the two hub sections 1 and 2 abut and are securely united by inner and outer annular rows of bolts 7 and 8, or analogous fastenings, whereby the two-part hub is made solid and rigid and the bushing 6 effectively retained within it.

The hub is connected by means of inner and outer annular series of resilient spokes 9 to a tire member or rim which is also preferably constructed of two similar pressed steel sections 10 and 11, as shown more clearly in Fig. 3. These two similar tire sections 10 and 11 are annular in form and have their inner edges bent inwardly to provide annular flanges 12, united by bolts or similar fastenings 13. These flanges 12 on the two tire sections not only serve as uniting flanges but also to reinforce and strengthen the tire. The outer edges of the two tire sections 10 and 11 are curved inwardly to form spaced flanges 14, between or upon which may be arranged any suitable tread member. As illustrated more clearly in Figs. 3 and 4, I may provide an annular tread member 15 composed of what is termed "Friction" which is a composition employed in making paper friction wheels. It will be understood, however, that the tread member may be made of other material. When made of friction, I preferably shape it as shown in Fig. 3 and provide at its side edges flanges 16 which are disposed within a channel formed by the tire sections 10 and 11 and which engage the curved flanges 14 to retain the tread member in position. The outer surface of the tread member 15 is preferably corrugated, as shown at 17, and these corrugations are diagonally arranged, as shown in Fig. 7. When the corrugations on the tread are diagonally arranged, the wheels on opposite ends of the axles of the vehicle have the corrugations in their treads disposed in opposite relation to prevent skidding of the vehicle.

When the tread member 15 is employed, I prefer to fill the hollow portion of the tire with a suitable slightly yieldable material. This filler is indicated at 18 in the drawings and it will be understood that it may be made of any slightly yieldable or cushioning substance.

Instead of employing the tread member above described, I may unite the flanges 14 of the tire sections by a tread member 19, as shown in Fig. 8. This member 19 is formed of a transversely curved strip of steel or other metal bent into annular form and united by rivets or other fastenings 20 to the flanges 14. This tread member 19 is preferably formed with a centrally arranged annular seat in which is shrunk a metal hoop or rod 21, which will tend to prevent skidding of the wheel.

The spring spokes 9 are constructed of rods of steel or other suitable metal and they have their intermediate portions bent to form cylindrical coils 22 of proper size and shape. These coils may be arranged at any point throughout the lengths of the spokes although I have shown them in the drawings as arranged adjacent the outer ends of the same. As above stated, the spokes 9 are arranged in two annular series and it will be noted on reference to Fig. 2 that the inner series is disposed in a perpendicular or substantially perpendicular plane, while the spokes of the outer series are inclined inwardly from the hub toward the tire to brace the wheel and prevent dishing.

The outer extremities of the spokes 9 are formed with enlarged flattened heads 23 which are pivotally connected to clips 24 secured to the inner portions of the tire sections 10 and 11. These clips 24 are formed with oppositely projecting apertured attaching flanges 25 which are united by bolts or similar fastenings 26 to the tire sections, said bolts 26 passing through apertures in said sections and having pairs of nuts 27 on their threaded ends, whereby they are effectively locked in position. Suitable recesses are formed in the filler member 18 for the reception of the nuts 27, when such filler member is made of soft wood or analogous material, (see Fig. 4). The body portions of the clips 24 are bifurcated to form recesses 28 for the reception of the ends or heads 23 on the spokes and these recesses and heads are milled so that a snug fit will be effected. A transverse pivot 29 in the form of a bolt passes through a pivot opening in each of the heads or ends 23 and through alining openings in the spaced portions or ears 30 on the clip 24 formed by bifurcating or recessing its body portion, (see Fig. 3). The opening in the outer ear 30 is screw threaded as shown at 31, for the reception of the pivot bolt 29 so that when the latter is tightened the two ears 30 will be drawn tightly together to snugly engage the head 23 between them and thereby prevent looseness and rattling of the parts, but at the same time allow the spoke to have a slight swinging movement on the pivot bolt 29. In this connection it will be noted, that the extremity of the head 23 is curved on an arc concentric with the pivot 29, as clearly shown in Fig. 4. A lock nut 32 is applied to the projecting outer end of the pivot bolt 29 to securely retain the same in position after it has been adjusted. The heads 23 may be formed with oil supplying apertures 33, whereby a lubricant may be fed to the pivot 29.

The connection of the inner ends of the spokes 9 with the hub is very similar to the connection of their outer ends and it is clearly shown in Figs. 5 and 6, on reference to which it will be noted that the inner end of each spoke 9 is formed with an enlarged flattened head 34, similar to the head 23, mounted on a transverse pivot bolt 35 in the enlarged bifurcated head 36 of a clip bolt 37. The threaded ends of the several clip bolts 37 pass through apertures in the flanges 5 of the two head sections 1 and 2 and on said ends are arranged adjusting nuts 38 which engage the flanges 5 and when tightened against the latter control the tension of the spokes 9. These nuts 38 are adjusted when the wheel is assembled in order to put the proper tension on the spokes and center the hub with respect to the tire. After the nuts 38 have been adjusted nuts 39 are screwed against them and extra lock nuts 40 on the bolts 37 are screwed against the outer faces of the flanges 5 to securely fasten the clip nuts in adjusted position so that they cannot possibly work loose.

I regard it of great importance to have the ends of the spokes formed with enlarged flattened heads and fitting in milled recesses in the bifurcated clips 24 and 36, so that the spokes will have a slight swinging movement and at the same time be prevented from having lateral movement which would tend to weaken the wheel and cause rattling. By constructing these pivotal connections or joints as above described, the parts will have necessary movement, but at the same time be firmly connected to give the wheel the necessary strength and to prevent noise and undue wear.

For the purpose of protecting the spring spokes from dust, rain, etc., and also to give the wheel a more attractive appearance, I may cover the spokes with tubular casing members 41 and 42, the opposing ends of which telescopically engage each other, as clearly shown in Fig. 1 and the opposite ends of which bear against the tire and hub of the wheel. These casing members or tubes entirely envelop the spring spokes and their connections and in order to yieldably maintain them in contact with the tire and hub without restricting the resiliency of the spokes, I provide within the telescoping ends of said tubes or members stops 43 between which is arranged a coiled spring 44, the latter surrounding the spoke, as clearly shown in Figs. 1 and 2.

From the foregoing description, it will be seen that in a wheel constructed as illustrated, the weight of the vehicle or load will be suspended from the upper spring spokes and, consequently, all shocks and jars which the tire receives in traveling over rough roads will be absorbed by the spring spokes and not imparted to the body of the vehicle and, consequently, the wheel will have the cushioning action which is necessary for comfortable riding in an automobile or other vehicle and this result will be obtained without the use of pneumatic tires on the wheels. The peculiar construction of the parts renders my improved spring wheel and tire strong and durable and also comparatively inexpensive to manufacture.

While I have shown and described in detail the preferred embodiment of my invention, I wish it understood that changes in the form, proportion, size, shape, and arrangement of parts and in the details of construction may be resorted to within the spirit and scope of the claimed invention.

I claim:—

1. A wheel of the character set forth comprising a hub composed of united stamped metal sections having circular flanges, a tire composed of united stamped metal sections and carrying a tread member, clips on the flanges of the hub sections and on the tire sections, resilient spokes having coiled portions and flattened heads at their extremities to fit in said clips, pivots uniting the heads of the spokes to said clips, telescoping tubular casing members arranged on the spokes and bearing against the tire and hub to completely envelop the spoke and its connections, stops within the telescoped ends of the casing members, and coiled springs on the spokes and engaged with said stops.

2. A wheel of the character set forth comprising a hub, a tire, resilient spokes each having a coiled portion, pivotal connections between the ends of the spokes and the hub and tire, tubular casing sections arranged on the spokes and having their opposing ends telescoped and their opposite ends bearing against the hub and tire, stops within the telescoped ends of the casing members and coiled springs arranged on the spokes between said stops to force the casing members apart and maintain them in engagement with the hub and tire.

In testimony whereof I have hereunto set my hand in presence of two subscribing witnesses.

GEORGE LINCOLN HAYS.

Witnesses:
C. H. GRIESBAUER,
L. O. HILTON.